May 27, 1941.　　　L. S. HARBER　　　2,243,338
DIVIDING DOUGH AND THE LIKE
Filed Nov. 16, 1940　　　3 Sheets-Sheet 1
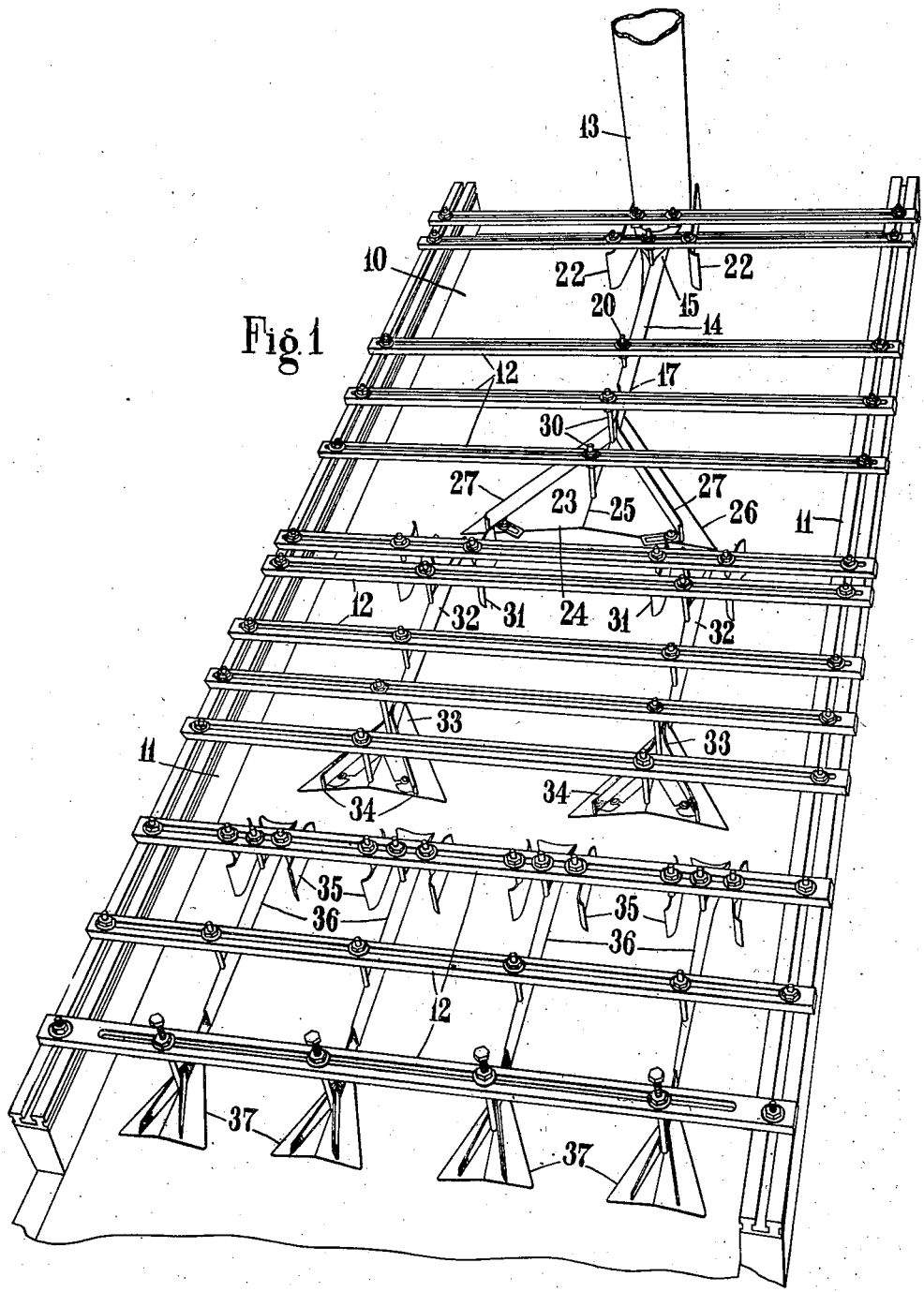
LAURENCE S. HARBER
BY
ATTORNEY May 27, 1941.  L. S. HARBER  2,243,338
DIVIDING DOUGH AND THE LIKE
Filed Nov. 16, 1940  3 Sheets-Sheet 2
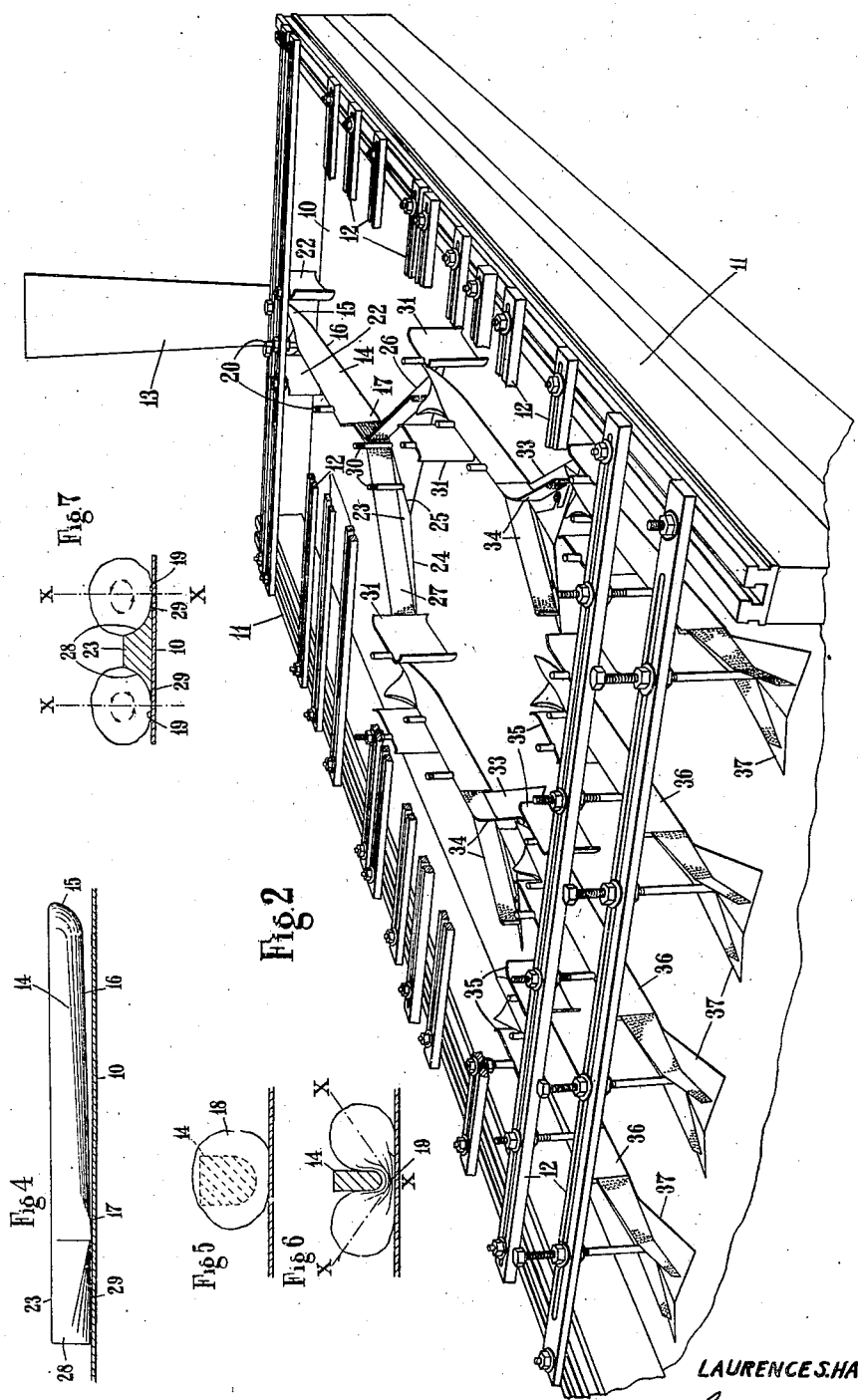

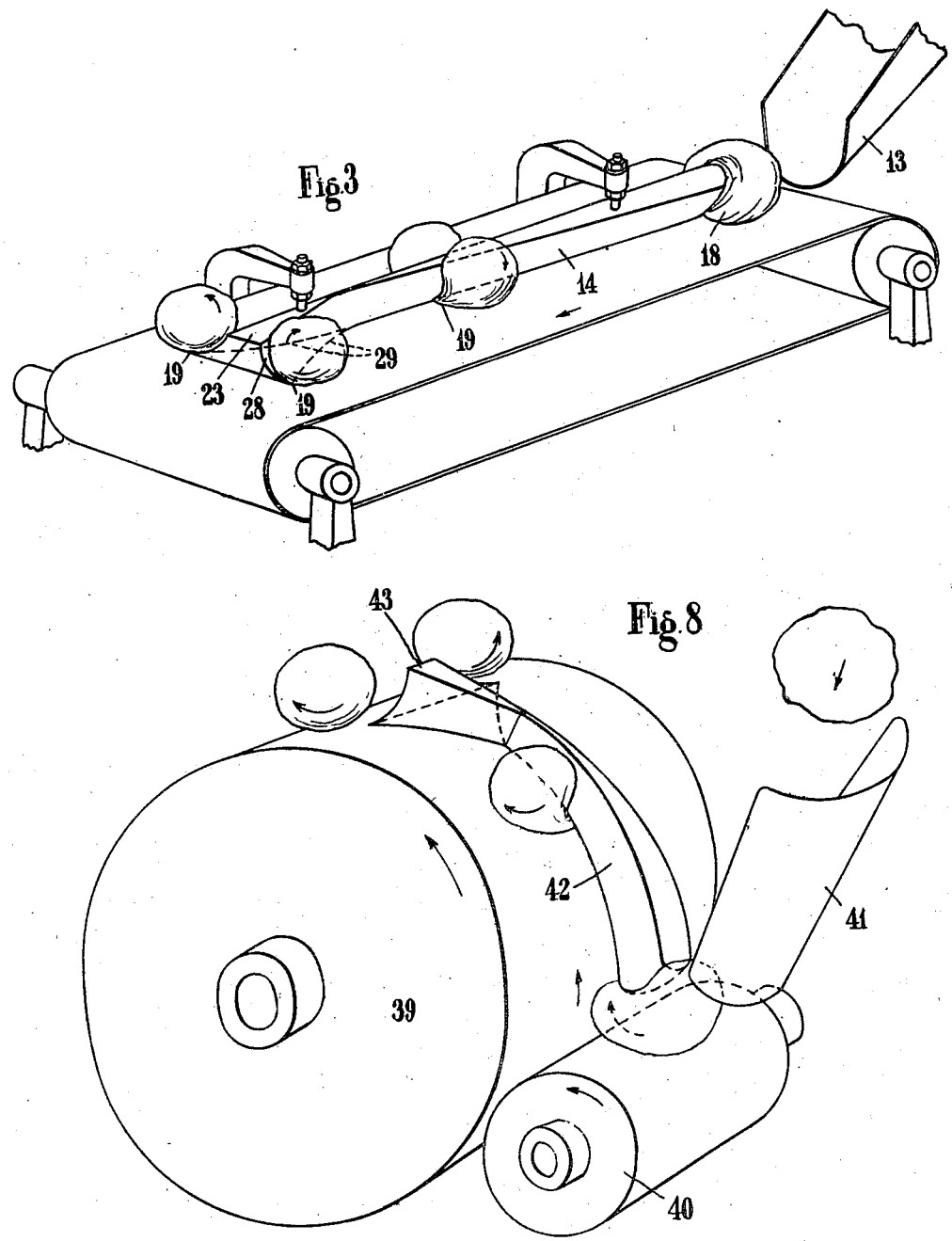

Patented May 27, 1941

2,243,338

UNITED STATES PATENT OFFICE 2,243,338

DIVIDING DOUGH AND THE LIKE

Laurence Seymour Harber, Peterborough, England, assignor to Baker Perkins Incorporated, Saginaw, Mich.

Application November 16, 1940, Serial No. 365,904
In Great Britain March 17, 1939

4 Claims. (Cl. 107—9)

This invention relates to an improved means for dividing bread dough and is especially suitable for the subdivision of a dough piece into a number of smaller pieces for forming a composite loaf, or for other purposes.

In my prior British Patent No. 514,659, November 14, 1939, is described the division of a dough piece into two substantially equal portions by a severance process as distinct from known dividing methods in which dough is forced into measuring chambers or cavities, and according to one application of the present invention it is proposed to employ this severance process to the division of a dough piece into a series of substantially equal small pieces, which may be used for example for loaves made of a vertical laminae consisting of a series (say eight) of flattened dough pieces. Hitherto such loaves have been produced by a plant comprising a multi-pocket divider dividing dough pieces, a hander or baller up, and a prover for proving the dough pieces (see my U. S. Patent No. 2,045,228, issued June 23, 1936), and an aim of the present invention is to dispense with the use of multi-pocket divisions as above indicated and to produce the multi-piece loaf from, say, a 2-pound dough piece, obtainable by any standard dough piece producing means and to treat it to subdivision.

The invention consists in dividing a dough piece into a plurality (say two pieces), separating or increasing the lateral spacing between the divided pieces and subdividing each piece again into further (say two) pieces, the division and subdivision being carried out during the continuous travel of the dough by engagement with an elongated blade or member.

According to the invention a dough piece of predetermined weight is progressively divided and subdivided to produce a predetermined number of like dough pieces so that a loaf is produced according to the predetermined weight of the initial dough piece.

The invention comprises elongated inclined dividing blades spaced above a dough conveyor with which the blades co-operate to part each dough piece as it is uniformly engaged between a blade and the conveyor, the arrangement being such that dough pieces are initially divided and subsequently subdivided repeatedly according to the number of dividing blades provided in train to engage the pieces successively.

Another object of the present invention is to provide means, in association with severance means of the above character wherein such be employed for dividing a dough piece into two or treating it to further subdivisions, for sealing the severed ends or necks and disposing the severed ends or necks so that the dough pieces may be presented symmetrically for further treatment, and to this end, according to the invention, the severed neck of each divided dough piece is located by neck control means in mid-position beneath the body of its piece.

The neck control means is preferably constituted by an inclined foot piece and fence adapted to guide the path followed by the necks while allowing the body of the dough pieces to overlap the foot piece and turn over against the fence, the action of which is to cause the dough pieces to revolve about their necks as they are carried forward by the conveyor.

When there is series subdivision it will be appreciated the neck control means ensures that each subdivision takes place symmetrically through the severed necks and similarly, for example, where there is a single division followed by say flattening operation, the dough pieces are flattened with the neck portion disposed substantially centrally thereof.

In the accompanying drawings—

Figures 1 and 2 are perspective views of a dough dividing machine according to the invention arranged for serial subdivision;

Figure 3 is a diagrammatic perspective view of the machine arranged for single division;

Figure 4 is a longitudinal section through the dividing blade and neck control device;

Figures 5, 6 and 7 are sections at various points illustrating the action of the dividing blade and neck control device.

Figure 8 is a diagrammatic view of a modification employing a rotary drum conveyor.

In carrying the invention into effect according to one convenient mode as described by way of example, as applied to the simultaneous production of a series of dough balls suitable for treatment and baking according to the above Patent No. 2,045,228, a broad endless conveyor 10 of canvas (or other suitable material) is mounted to move horizontally and is driven by any suitable means. This conveyor is adapted to more or drive the dough to be divided into engagement with the dividing apparatus to be described. At each side of the conveyor guide rails 11 which are preferably slotted are provided for supporting transverse slotted bars 12, the slots in the rails 11 enabling the bars to be adjustably secured by T-head bolts longitudinally of the conveyor, while the slots in the bars 12 enable the parts employed in association with the conveyor for dividing and guiding the dough to be adjustably secured transversely of the conveyor.

At the end of the conveyor, away from which the conveyor surface travels, a funnel or chute 13 is mounted for guiding the dough pieces to be divided into the initial position on the conveyor 10. This chute is arranged about the middle of the end of the conveyor and is preferably adapted to deliver the dough pieces on to the conveyor 10 in the form of short cylinders or balls.

On the middle line of the conveyor a dough dividing blade or member 14 is mounted, being carried by a pair of spaced slotted bars 12. The blade is provided with an upwardly curved portion 15 at its forward end (i. e. that which is located towards the funnel) and may be in the form of a solid bar or rod. The blade or bar 14 is mounted so that its under surface 16 is inclined and approaches the conveyor surface 10 in the direction in which the latter is travelling. At the curved end 15 the blade or bar may be of circular or broad cross section (see Figure 5) and the area of the cross section may be diminished in the direction towards its further end (see Figure 3), terminating in a narrow edge or cutter 17. It is preferred that the major portion of the under surface of the bar should present an arcuate or reduced surface to the dough so that when a dough piece delivered from the funnel 13 meets the upwardly curved end 15 of the dividing blade or bar the middle section of the dough piece 18 is gradually depressed as the conveyor 10 drives it along under the blade or bar and the neck 19 formed in the dough is subjected to rotation between the blade or bar surface and the conveyor. Thus the dough is severed by a combined twisting and stretching action rather than a cutting action which is adapted progressively to stretch and seal the skin over the portion being severed, with a view to preventing anything in the nature of a raw cut.

Instead of making the dividing member of a solid bar as indicated in Figures 3–6, a member of similar shape may be formed of sheet metal as indicated in Figures 1 and 2, the edges of which are bent upwardly into U-shape, which is wide open and curved upwardly at the forward or dough receiving end and gradually brought together towards the tail or discharge end, finally terminating in a tail piece where the sheet metal is folded face to face. The dividing member 14, whether solid or of sheet metal, may have a pair of spaced screw-threaded posts 20 which may be secured by nuts in the spaced slotted bars 12 referred to above, adjustably to fix the member in the appropriate position, or such posts may be adjustably secured in overhanging brackets 21 (Figure 3).

Between the funnel 13 and on either side of the upwardly curved portion of the dividing member 14, guide wings may be provided which consist of vertical plates 22 (Figure 1) having curved entrance and exit lips. These wings or plates are for the purpose of locating each piece of dough centrally with respect to the dividing member 14 so that the latter acts directly on the middle portion of each dough piece.

It will be appreciated that a dough piece having been forced under the dividing member 14 by the conveyor 10, is parted into two equal portions, each having a severed and twisted neck 19 lying against the opposite sides of the tail piece or end of the dividing member 14. In this position the dough pieces are adapted to be separated or spaced apart transversely of the conveyor 10 and to this end a V-shaped or triangular spacing and neck positioning device 23 is provided. According to one appropriate form (see Figures 1 and 2) this spacing device 23 comprises a plate 24 of triangular shape in plan and is somewhat bent into a form having a shallow ridge 25 running from the apex to the base. The apex of the plate is located in the direction from which the conveyor 10 is travelling and positioned immediately in rear of the tail piece or termination of the dividing member 14. The bent or curved form of the plate 24 is for the purpose of causing its side edges 26 to lie closely adjacent the conveyor surface 10 and these edges may be ground or bevelled in order to reduce their thickness as they lie upon the conveyor, and prevent the dough from getting underneath the plate. Inward of each of these edges is a vertical wall 27, the two walls being arranged V fashion with the point of the V toward the apex of the plate. The walls 27 are spaced from the edges of the triangular plate, the spacing distance being approximately equal to the radius of the divided dough piece. The walls 27 may be roughened or made of stabbed metal so that they exercise a driving contact with the dough pieces.

According to the form diagrammatically shown in Figure 3 the spacing and neck positioning device 23 may be formed integrally with the dividing plate or bar 14. The device 23 is formed solid and has diverging walls 28 which merge into the side walls of the plate 14. The walls 28 are concave and terminate adjacent the conveyor surface 10 in the side edges 29.

The purpose of the triangular spacing and neck positioning device 23 is not only to separate the divided pieces but to cause the neck 19 of each to be positioned underneath the middle of its piece instead of at the side as the necks are located when they reach the tail 17 of the dividing member (see Figure 6). The edges 26 or 29 of the triangular plate 24 or device 23 are met by the necks as the pieces are forced forward by the conveyor 10 and these edges constrain the necks to travel therealong, while the body of the dough piece is impelled or rolled over onto the margin of the plate 24 between the edges and the V-shaped walls 27, or upon the concave wall 28. As the dough pieces contact with the walls 27 or 28 they are revolved above axes $x$—$x$ which are coincident with the necks 19, and the necks proceed along the edges as the revolving dough pieces travel forward until finally when they arrive at the forward ends of the walls the axes $x$—$x$ become vertical with the necks 19 located below the dough pieces.

By causing the dough pieces to roll over onto their necks 19 it is ensured that the subsequent division of each dough piece is effected vertically through each neck, thus securing a symmetrical treatment both as regards bulk and uniformity of skin of the pieces.

The triangular member 23 (Figures 1 and 2) may be mounted in a similar way to that described with reference to the dividing member 14, that is to say it may have screw-threaded posts 30 adjustably secured in a pair of slotted bars 12.

As the dough pieces reach the terminal corners of the triangular plates each passes between a pair of guiding wings 31 similar to those already described in reference to the funnel 13. These wings 31 direct each dough piece under a subdividing bar or plate 32, which is a replica of that already described and has at its tail a corresponding triangular spacing and neck-positioning plates 33 having walls 34.

It will be appreciated that when the dough has reached the terminal corners of the pair of triangular plates 33 in rear of the second dividing members 32, the original dough piece is divided into four equal portions.

Where it is required further to subdivide the dough piece, for example into eight pieces, each of the subdivision triangular members 33 referred to above has opposite its base corners wing members 35 and further subdividing members like those already described, there being in this case four sets of subdividing elements 36 with co-operating spacing and neck-positioning triangular members 37. The four balls of dough which leave the pair of triangular members 33 pass between wing members 35 and come under the four additional subdividing members 36, so that the four pieces are again subdivided into eight pieces, each of which has its division neck turned under its body portion. The second and subsequent division devices may be of progressively smaller dimensions suitable to the size and spacing of the dough pieces.

As the conveyor proceeds on its travel these eight dough pieces are carried forward for delivery or subsequent treatment.

Assuming that the subdividing machine as shown in Figures 1 and 2 is fed with dough pieces such as produced by any of the well-known dividers suitable for making a two-pound loaf, the apparatus will subdivide the two-pound dough pieces into sets of substantially uniform balls of approximately four ounces each.

The action of the dividing means, it will be appreciated, has the minimum punishing effect upon the dough, since it is effected solely by a constricting action upon a localised portion of the dough, and the pieces at the termination of the operation are suitable for baking without further proof, and may for example, after being subjected to a flattening operation, be put straight into tins for carrying out the process described in my United States Patent No. 2,045,228.

Where it is desired to divide dough pieces while at the same time elevate them for conveyance or further treatment the division may take place upon a rotary drum surface.

The drum construction may be used for dividing a single train of dough pieces into two, or for dividing a plurality of trains of dough pieces in parallel each into two pieces. For convenience this modification of the invention will be described with reference to the treatment of a single train of dough pieces upon a drum.

In Figure 8 which diagrammatically illustrates a machine according to such modification, the drum 39 has a co-operating feeding roll 40 to which the dough pieces are delivered by the chute 41. The dividing element or blade 42 which has the characteristics of the blade 14 shown in Figure 3 and which is integral with the divergent spacing and neck positioning device 43, is curved longitudinally to conform to the curvature of the drum 39. The lower edge or surface of the blade 42 progressively approaches the surface of the drum in the direction of travel, as in the case of the conveyor band form of the invention.

The spacing and neck positioning device 43 terminates at or adjacent the top of the drum where the divided dough pieces are separated and arrive with their necks located beneath the pieces.

The feeding end of the dividing blade 42 may be positioned relatively to the drum at any desired position according to its length and the diameter of the drum, and as shown such end may be located about 90° from the spacing and neck positioning device.

It will be appreciated that the dough pieces during the dividing operation will be elevated by the drum until they are finally separated and have their neck axes turned vertical when they are delivered or subjected to further treatment.

I claim:

1. In apparatus for severing a dough piece into a plurality of dough pieces comprising a traveling conveyor and stationary severing means positioned lengthwise of said conveyor, in combination, neck control means provided at the delivery end of said severing means consisting of stationary divergent inclined surfaces closely adjacent the conveyor surface at their lower margins and at their forward extremities extending substantially to the lateral planes of the severing means for engagement by the severed dough portions, said surfaces co-operating with the conveyor to turn the dough pieces delivered from the severing means so that their severed necks are downward upon the conveyor.

2. Apparatus for dividing a dough piece into fractional parts comprising a conveyor and a plurality of stationary blades aligned therewith, having their bottoms inclined with relation thereto, and operative to sever dough pieces carried by said conveyor, said blades being spaced along said conveyor in sets each comprising twice the number of blades at the next preceding station to divide each dough piece and its subdivided parts successively in two, whereby the final subdivided parts are substantially aligned across the conveyor in position for simultaneous discharge and reassembly into a loaf consisting of the original measured dough piece.

3. In apparatus for dividing and subdividing a dough piece by two or more successive subdivisions, as claimed in claim 2, stationary means presenting divergent inclined surfaces at the rearward ends of the severing blades adapted to engage the severed dough pieces traveling on the conveyor and turn their severed necks down upon the conveyor, whereby said necks are sealed and each piece is positioned so that a subsequent severing operation will be effected axially through the neck.

4. Apparatus for severing a dough piece as claimed in claim 1, wherein the divergent inclined surfaces of the neck control means are concave in section taken normal to the travel of the severed dough pieces.

LAURENCE SEYMOUR HARBER.